Dec. 23, 1924.

L. D. SOUBIER ET AL 1,520,213

GLASS FEEDER

Filed Oct. 28, 1921  4 Sheets-Sheet 1

INVENTOR
LEONARD D. SOUBIER
ENOCH T. FERNGREN
By J. F. Rule
THEIR ATTORNEY

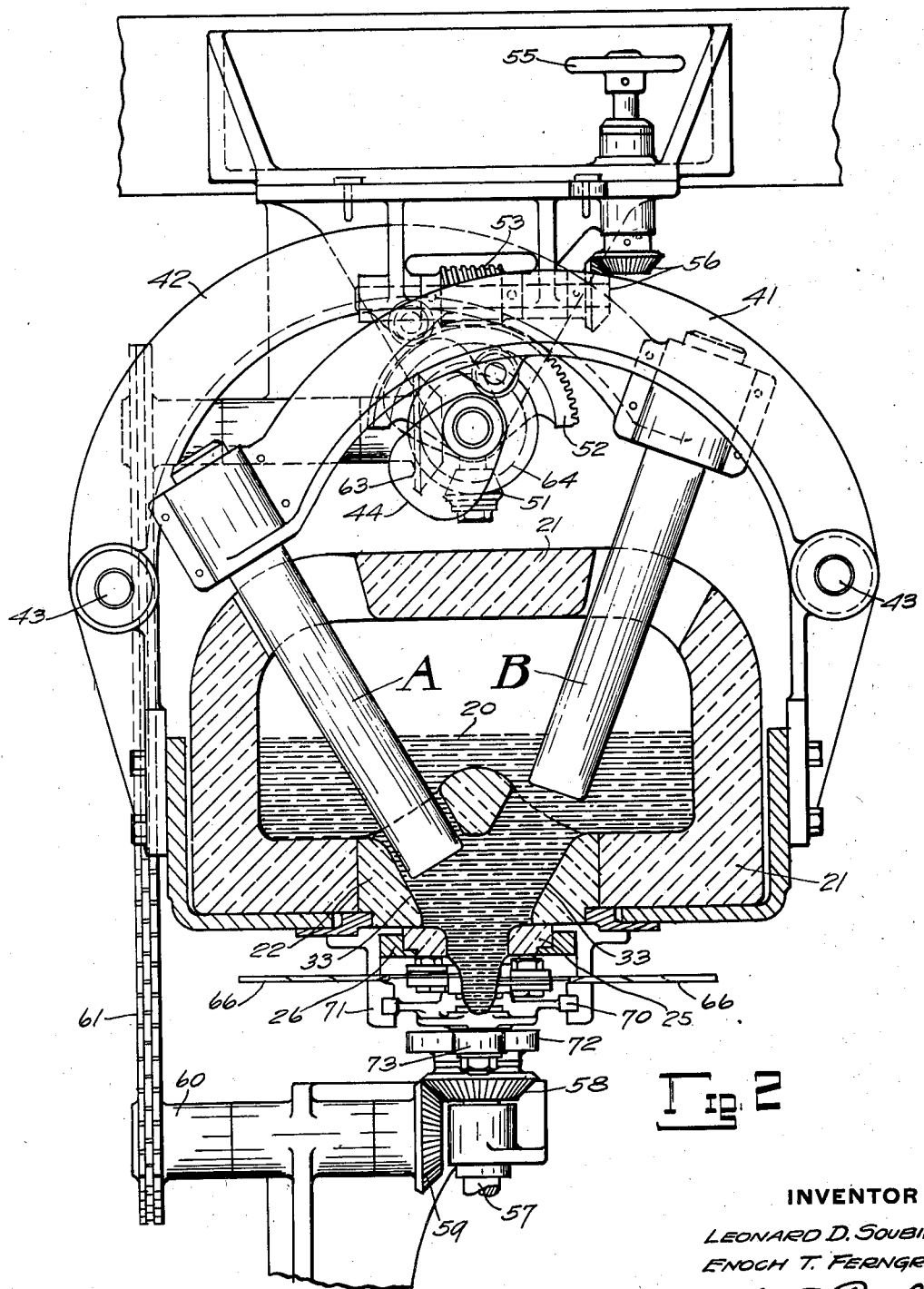

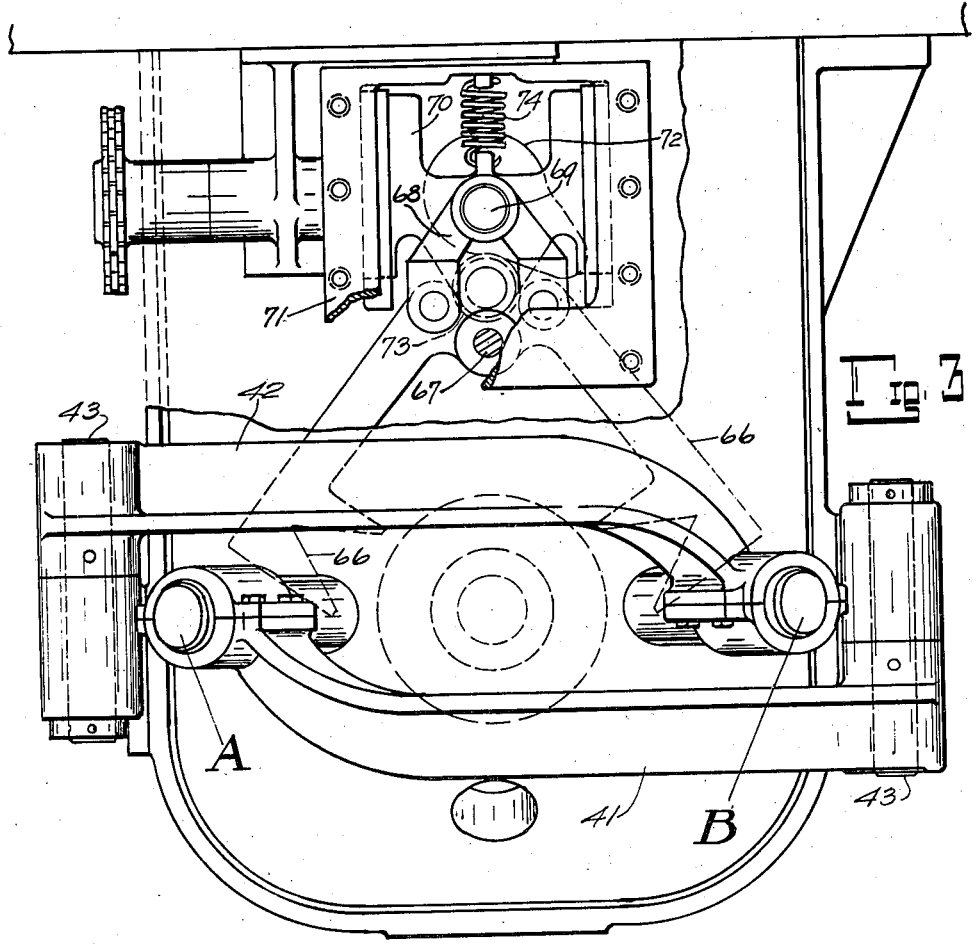
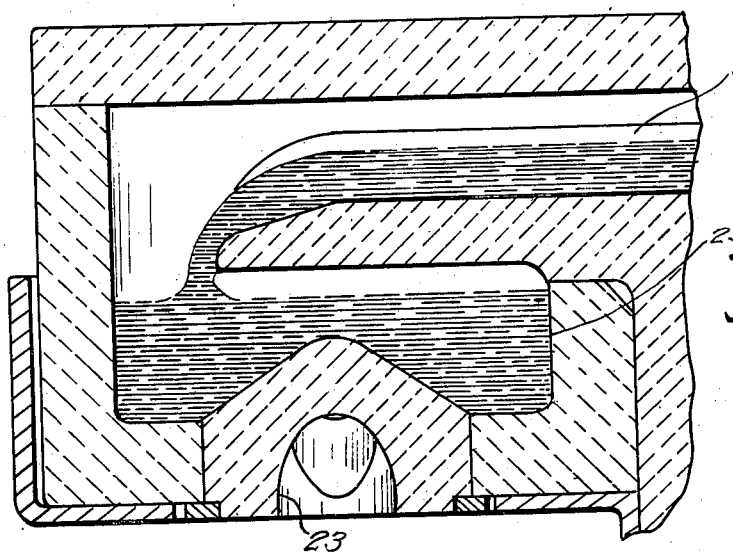
INVENTOR
LEONARD D. SOUBIER
ENOCH T. FERNGREN
By J. F. Rule.
THEIR ATTORNEY Dec. 23, 1924. 1,520,213
L. D. SOUBIER ET AL
GLASS FEEDER
Filed Oct. 28, 1921 4 Sheets-Sheet 4
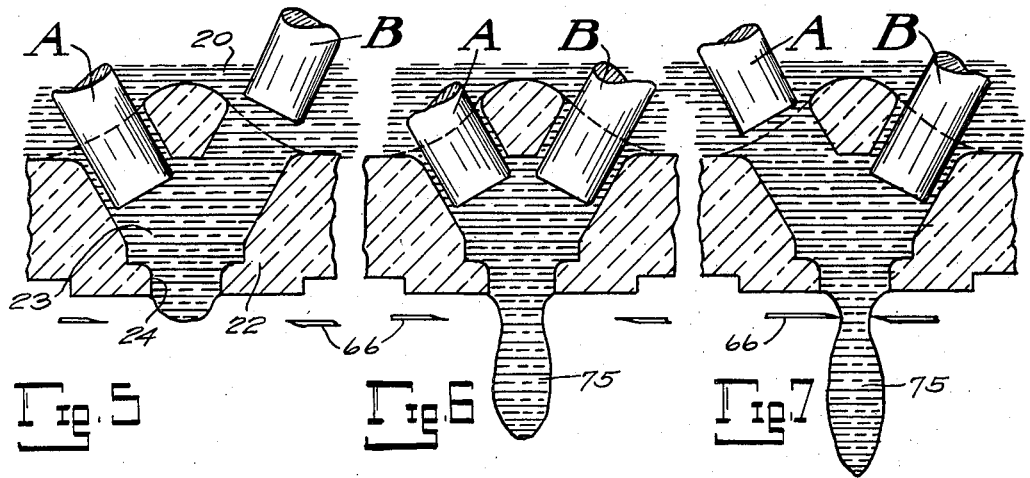
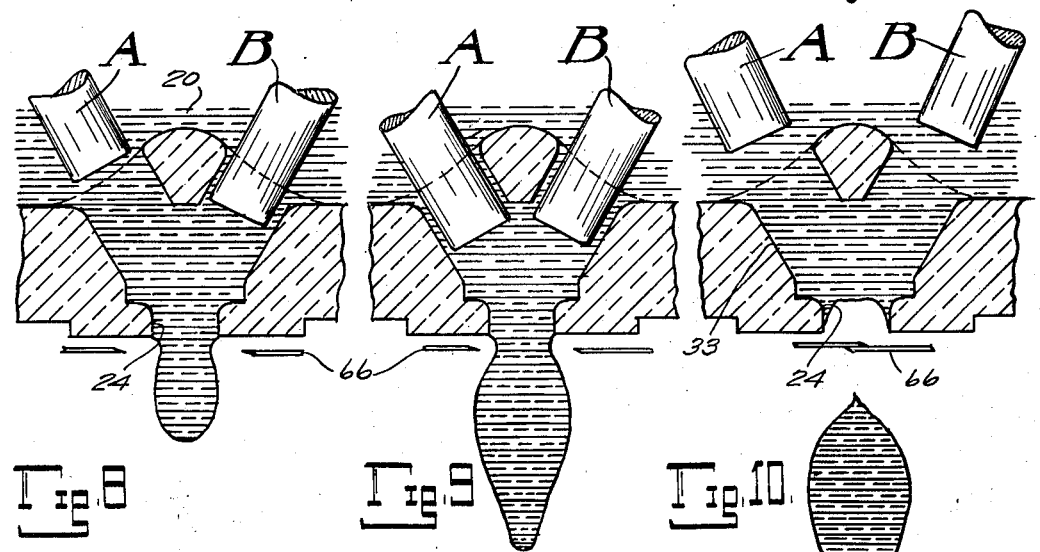
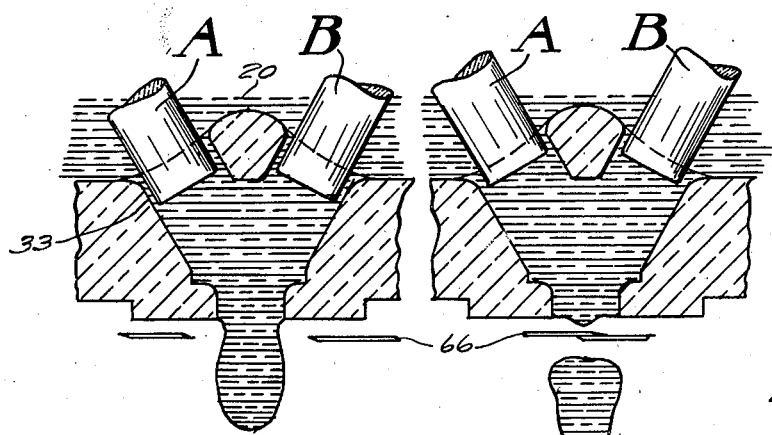
INVENTOR
LEONARD D. SOUBIER
ENOCH T. FERNGREN
BY J. F. Rule
THEIR ATTORNEY Patented Dec. 23, 1924.

1,520,213

UNITED STATES PATENT OFFICE.

LEONARD D. SOUBIER AND ENOCH T. FERNGREN, OF TOLEDO, OHIO, ASSIGNORS TO THE OWENS BOTTLE COMPANY, OF TOLEDO, OHIO, A CORPORATION OF OHIO.

GLASS FEEDER.

Application filed October 28, 1921. Serial No. 511,112.

*To all whom it may concern:*

Be it known that we, LEONARD D. SOUBIER, a citizen of the United States, residing at Toledo, in the county of Lucas and State of Ohio, and ENOCH T. FERNGREN, a citizen of the United States, residing at Toledo, in the county of Lucas and State of Ohio, have invented new and useful Improvements in Glass Feeders, of which the following is a specification.

Our invention relates to a method and apparatus for feeding molten glass and forming it into individual masses of predetermined shape which serve as charges for the molds of a glass blowing or forming machine. An object of the invention is to provide a practical method and form of apparatus of the character indicated by which the size and shape of the charges, their rate of production and other factors entering into the production of such charges, may be readily controlled and varied within wide limits.

In its preferred form, the invention comprises a displacement chamber or container for molten glass provided with an outlet opening in the bottom thereof, a plurality of plungers projecting downward into the glass within the container, means to reciprocate the plungers periodically for controlling the discharge of glass, and means to periodically sever the charges of extruded glass depending from the outlet orifice. Molten glass may be admitted to the displacement chamber through openings in the upper walls thereof, through which the plungers also extend, the flow of glass through said openings being more or less restricted, depending on the position of the plungers. An additional opening may also be provided in a wall of the displacement chamber for the ingress of glass, restricted by an adjustable stationary plug or valve. The expelling and retarding force applied by the plungers to the issuing glass is governed largely by the extent to which the openings for the ingress of glass are restricted. Mechanism is provided for reciprocating the plungers either alternately, simultaneously or in an intermediate timed relation, suitable means being provided for differentially adjusting the time relation of the plunger movements.

Other features of the invention and the specific construction involved in carrying out the invention in its preferred form will appear more fully hereinafter.

In the accompanying drawings:

Figure 2 is a part sectional front elevation of the same.

Figure 3 is a plan view of the same, parts being broken away.

Figure 4 is a sectional side elevation showing a modified arrangement for flowing the glass into the discharge chamber.

Figure 1:
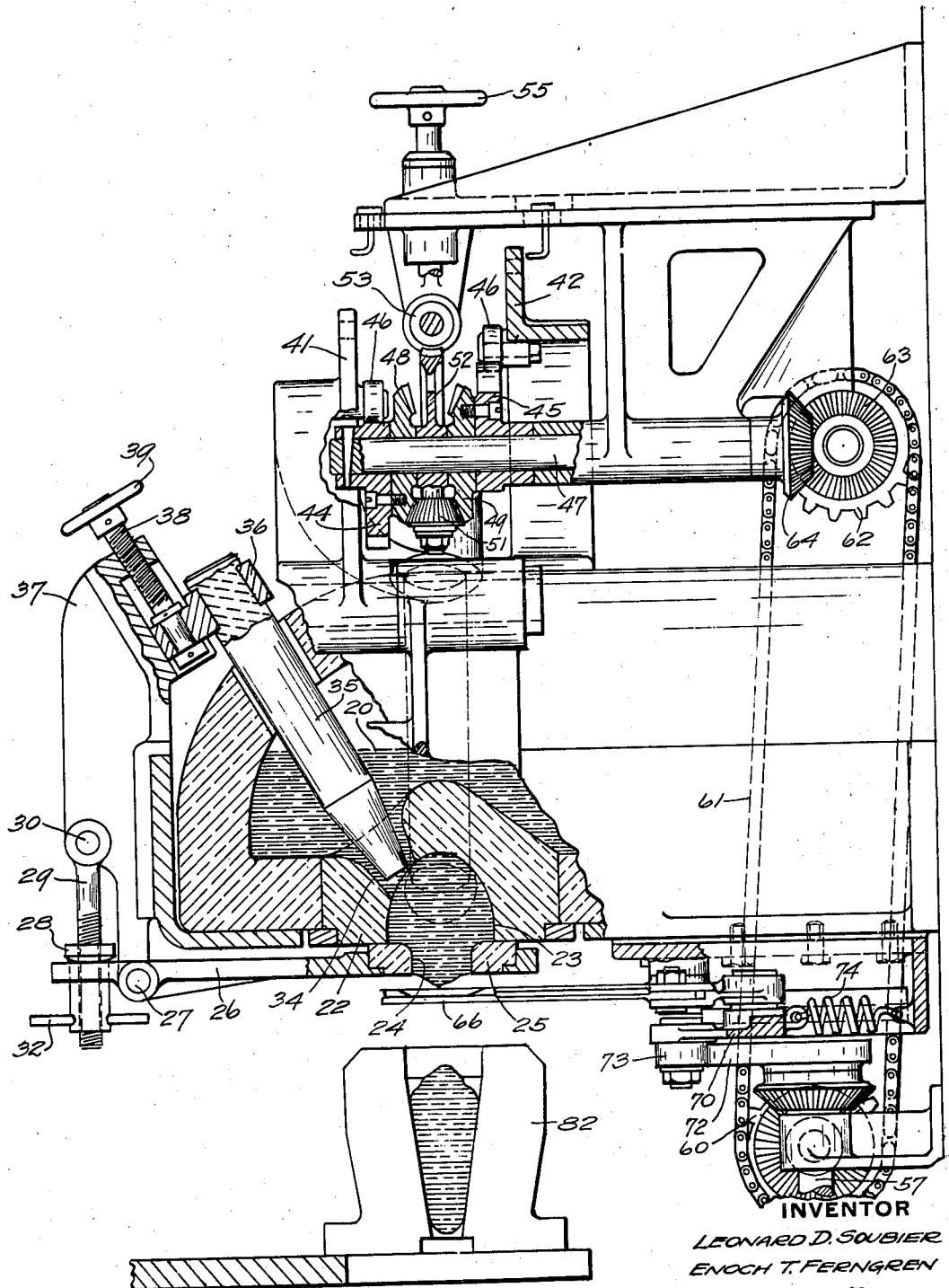
Figure 1 is a part sectional side elevation of an apparatus constructed in accordance with our invention.

Figures 5 to 12 inclusive, are diagrammatic views illustrating the operation of the plungers. Figures 5 to 7 show the position of parts at successive periods during a cycle of movements when the plungers are adjusted for producing one form of charge. Figures 8 to 10 illustrate the parts at successive periods when adjusted for a different form of charge. Figures 11 and 12 illustrate a still different operation.

Molten glass 20 is continuously supplied to a boot or extension 21 of a furnace. Fitted in the floor of the boot is a block 22 formed of fire clay or other refractory material, said block being shaped to form a displacement chamber 23 into which the molten glass is admitted from the body of the boot and from which the glass is discharged in the manner hereinafter set forth. A clay bushing 25 fitted to the bottom of the discharge chamber 23, provides an outlet orifice 24. The bushing 25 may be carried by a lever 26 having a fulcrum 27, and is held in position by means of a nut 28 threaded on a rod 29 on a pivot 30. The nut 28 is turned down on the rod 29 by means of a handle 32 to clamp the bushing 25 in position. By loosening the nut 28, the rod 29 may be swung about its fulcrum to release the lever 26 and allow it to drop.

The block 22 is formed with inclined openings 33 through which glass may enter the discharge chamber, the movement of glass through said openings being controlled by plungers A and B. An opening 34 is also provided in the block 22 for admission of glass to the discharge chamber 23, this latter opening being controlled by a regulating plug valve 35. The regulating plug is carried by a head 36 slidably mounted in a standard 37. An adjusting rod 38 attached to the head 36 is threaded in the standard and provided with a hand wheel 39. By rotating the hand wheel, the regulator 35 is moved in the direction of its length for increasing or decreasing the effective size of the opening 34 to thereby regulate the amount of glass permitted to enter the discharge chamber through said opening, and also to regulate the expelling and retractive force applied by the plungers to the glass at the outlet orifice.

The plungers A and B are carried respectively by arms 41 and 42, each having a stationary fulcrum 43. The plungers are reciprocated by means of continuously rotating cams 44 and 45 which engage rolls 46 carried on the arms 41 and 42 respectively. The cam 44 is keyed to a horizontal shaft 47 and has fixed thereto a gear 48. The cam 45 is free to turn on the shaft 47 and has secured thereto a gear 49 also loose on said shaft. The gears 48 and 49 mesh with a pinion 51 carried by an adjusting segment 52 loose on the shaft 47.

As the shaft 47 rotates, the cam 44 rotating therewith moves the arm 41 up and down, thereby reciprocating the plunger A about its fulcrum 43. The rotation of the shaft 47 at the same time transmits motion through the pinion 51 to the gear 49 and cam 45, the segment 52 being held stationary. The cam 45 rotates in the opposite direction from that of the cam 44 and operates to swing the arm 42 up and down, thereby reciprocating the plunger B.

A worm 53 in mesh with the worm gear segment 52 is rotatable by means of a hand wheel 55 on a vertical shaft connected through gears 56 to the worm shaft, to adjust the segment 52. Adjustment of the segment in either direction will cause a relative rotation of the gears 48 and 49, thereby differentially adjusting the cams and correspondingly adjusting the relative movements of the plungers.

Motion is transmitted to the shaft 47 from a continuously rotating drive shaft 57 (Figs. 1 and 2) which operates through bevel gears 58 and 59, sprocket wheel 60, chain 61 sprocket 62 and bevel gears 63, 64, the latter fixed to the shaft 47.

The cutting mechanism comprises a pair of cutters 66 mounted to swing about a stationary fulcrum pin 67. The cutter arms are actuated by a pair of links 68 connected at their forward ends to said arms and at their rear ends to a pin 69 on a slide block 70 mounted to reciprocate in stationary guides 71. The slide block 70 is reciprocated by a cam 72 which is fixed to the drive shaft 57 and runs in mesh with a roll 73 on the slide block. A spring 74 holds the roll in contact with the cam. Each complete rotation of the drive shaft causes a reciprocation of the slide block and through the links 68 operates to close and open the shear blades. The operation of the shears is synchronized with the movements of the plungers so that they operate each time a charge or gob of glass is ejected.

In operation, the plugs A and B are moved up and down through the openings 33 either alternately or both together, or they may be so timed that one operates a greater or less distance in advance of the other, depending upon the differential adjustment of the cams 44 and 45. These cams are removable and may be replaced by other cams of different shapes depending upon the particular movements it is desired to impart to the plungers. The plungers may be individually adjusted up and down in their carrying arms 41 and 42. These various adjustments enable a wide variation to be obtained in the size and shape of the gobs of glass. They also permit the weight and shape of the gobs to be controlled through a comparatively wide range of temperature variations.

Figures 5, 6 and 7 illustrate diagrammatically the positions of the plungers and the shape of the issuing glass at successive periods in a cycle of operations when the plungers are reciprocated in alternation. In Figure 5, the plunger A is in its lowermost position and remains at rest in such position while the plunger B is moved up and down once. The plunger B is shown in Figure 5 at the limit of its upward movement. In Figure 6, the plunger B has moved downward, thereby forcing out a charge or gob of glass 75. The plunger B now remains stationary in its lowered position while the plunger A is drawn upward. Figure 7 shows the condition as the plunger A approaches the limit of its upward movement. During this upward movement of the plunger A, there is a certain upward pull on the glass in opposition to gravity, owing to the glass adhering to the plug. This causes a necking in or restricting of the glass at the cutting plane. The plunger A, as shown in Figure 7, has passed the point at which its retractive power is most effective and the knives 66 are operating to sever the gob. When the plunger A moves downward, it will operate to expel the next succeeding gob of glass.

When the plungers are operating in the manner just described, the regulator 35 may be so adjusted that the glass may enter the displacement chamber 23 quite freely through the opening 34 under the influence of the retractive pull of each plunger as it moves upward. With the plungers operating as shown in Figures 5, 6 and 7, the cutters may be operated once for each reciprocation of a plunger, or in other words, twice during each complete cycle of operations of the plungers.

A variation in the results obtained may be effected by imparting to each plunger a short relatively rapid reciprocation just about the time the other plunger reaches its highest position. For example, when the plunger A reaches the Figure 7 position during its upward movement, the plunger B may be given a single rather rapid up and down movement. The plunger A will be given a short reciprocation in like manner when the plunger B is up. The effect of this short additional reciprocation of the plunger is to assist in recharging the displacement chamber, owing to the pull on the glass as the plunger moves up, and also to assist in expelling the glass through the discharge orifice during the short downward stroke of the plunger. The glass is thus expelled with greater speed and in a larger volume.

Figures 8, 9 and 10 illustrate an operation of the plungers when they are so adjusted that one operates a comparatively short distance in advance of the other. Figure 8 shows both plungers moving downward, the plunger B having about half finished its downward stroke and the plunger A having just commenced its downward stroke. When the plunger B reaches the limit of its downward movement, it remains at rest until the plunger A has also completed its downward stroke. The two plungers are now in their lowest position, as shown in Figure 9. The two plungers then move upward together. The cutters are preferably timed to sever the gob about the time the plungers commence their upward movement. As the plungers move upward they may pull the glass upward in the outlet orifice 24, as indicated in Figure 10. When the plungers are up, the glass can flow freely downward through the openings 33 to re-charge the displacement chamber. With the plungers operating in the manner just described and shown in Figures 8 to 10, the regulator 35 may be adjusted to close or materially restrict the opening 34 so that the downward movement of the plungers will be effected to expel the glass through the outlet 24. It will be noted that with the plungers operating in the manner just described, there is a complete reciprocation of both plungers during the formation of each gob and that the quantity of glass thus expelled, or in other words, the size of the gob, is much larger than with the operation shown in Figures 5 to 7. As indicated in Figure 10, the shears may remain closed for a substantial period of time after the gob has been severed, for the powerful retractive action of the plungers renders a comparatively slow operation of the shears practical. That is to say, the retraction of the glass due to the upward pull of the plungers prevents the glass from resting on the shears and chilling, even though the cutting action is comparatively slow. The regulator 35 may be used in the operation illustrated in Figures 8 to 10 to regulate the retractive pull of the plungers on the glass in the region of the discharge orifice. If the regulator is adjusted to open position, the upward movement of the plungers will tend to draw the glass into the displacement chamber through the opening 34 and thus reduce the retractive pull at the outlet opening 24. The plungers A and B may be either adjusted to operate simultaneously or differentially-adjusted to cause one plunger to operate any desired distance in advance of the other, depending on length, size and shape that it is desired to impart to the charge of glass. For instance, it may be desirable to form a long and tapered charge with the small end pointing downward, or it may be desirable to produce a short gob tapered at its upper end or to produce a variation in the diameter, all of which is within the range of results obtainable by the adjustments just indicated. The adjustments will also depend to an extent upon the nature and condition of the glass. With comparatively cold or viscous glass, the retractive force of the two plungers acting at the same time may be too great, in which event one plunger may be arranged to pause during the initial upward movement of the other plunger and then follow it in its upward movement. Also, one plunger may remain in its lowered position until the other has been raised. This will result in a more rapid filling of the displacement chamber from the glass entering beneath the elevated plunger or through the opening 34 if the regulator plug has been withdrawn, but will result in less retractive action at the discharge orifice.

Figures 11 and 12 illustrate an operation in which the two plungers move up and down simultaneously, and show one of the many forms of gobs which may be produced by such simultaneous plunger action. Figure 11 shows both plungers in their lowered position and the gob of glass extruded and depending from the outlet orifice. The up and down movement of the plungers in this instance is through a comparatively short distance. Figure 12 shows the plungers near their upper limit of movement. It will be noted that the plungers in this instance are not lifted out of the displacement chamber or a sufficient distance to permit any extensive flow of glass into said chamber through the openings 33. With the plugs operating in this manner, the regulator 35 is preferably raised to admit the greater quantity of glass required for each charge. The plunger action in this form of operation preferably consists of a rapid reciprocation. During the short lift of the plungers there is a retractive impulse imparted to the extruded glass which at the same time is severed. The downward stroke of the plungers quickly follows, thereby extruding the next gob. This form of operation is suited for the rapid formation in quick succession of gobs or charges which are comparatively short and approximate a spherical shape. Also, in this form of operation, the regulator 35 and the opening 34 may be dispensed with by adjusting the plunger strokes to a comparatively high position, or making such strokes long enough to admit glass into the displacement chamber through the passages 33.

A substantially cylindrical charge of glass of relatively large amount and symmetrical outline can be produced by moving the plungers downward simultaneously through a long stroke and with a gradually accelerated velocity. The cams controlling the movements of the plungers can obviously be adjusted and shaped to effect any of the above described or other operations which may be desired.

Figure 4 illustrates a modification in which the glass enters the displacement chamber 231 in a continuous stream at a point in front of the outlet 24. The glass is conducted to its point of discharge into the displacement chamber through a trough 81 which extends forward between the plungers, the latter being arranged as shown in the other views. In this manner the comparatively hot glass is conducted to the forward end of the displacement chamber where the tendency for the glass to chill is greatest, whereby freezing or stagnation of the glass in the said chamber is prevented and a substantially uniform temperature of the issuing glass is maintained. The charges of glass when severed drop into molds 82 (Fig. 1) which are brought successively beneath a discharge outlet.

Modifications may be resorted to within the spirit and scope of our invention.

What we claim is:

1. The combination of a container for molten glass, and a plurality of expelling devices operating periodically in alternation to apply an expelling force to the glass in the container.

2. The combination of a container for molten glass, a plurality of expelling devices operating periodically in alternation to apply an expelling force to the glass in the container, and means operating periodically to sever the expelled glass.

3. The combination of a container for molten glass having an outlet opening, controlling devices extending within the glass in the container in equivalent positions relative to said opening, and means for periodically actuating said devices alternately and in a predetermined time relation.

4. The combination of a container for molten glass, controlling devices extending within the glass in the container, means for periodically actuating said devices separately and in a predetermined time relation, and means to differentially vary the relative time of operation of said devices.

5. The combination of a container for molten glass having a discharge outlet, controlling devices extending into the glass in the container in equivalent positions relative to the outlet, and separate means for periodically moving each controlling device toward and from said outlet.

6. The combination of a container for molten glass having a discharge outlet, controlling devices extending into the glass in the container, separate means for periodically moving each controlling device toward and from said outlet, and adjusting means by which the time of operation of one device relative to the other may be adjusted.

7. The combination of a container for molten glass having a discharge outlet, plungers extending into the glass in the container in equivalent positions relative to the outlet, and means for periodically reciprocating each plunger toward and from said outlet.

8. The combination of a container for molten glass having a discharge outlet, plungers extending into the glass in the container, and means for periodically reciprocating each plunger toward and from said outlet, said means arranged to reciprocate the plungers in alternation.

9. The combination of a container for molten glass having a discharge outlet, plungers extending into the glass in the container, and means for periodically reciprocating each plunger toward and from said outlet, one plunger being operated in advance of the other.

10. The combination of a container for molten glass having a discharge outlet, plungers extending into the glass in the container, means for periodically reciprocating each plunger toward and from said outlet, and adjusting means to differentially vary the timing of said reciprocations and the extent that one plunger operates in advance of the other.

11. The combination of a container for molten glass having an outlet opening in the bottom thereof, plungers projecting downward into the glass in the container, and means to periodically reciprocate said plungers in alternation toward and from said outlet.

12. The combination of a container for molten glass having a discharge orifice, plungers projecting into the glass in the container, means to reciprocate the plungers comprising a rotating shaft, a cam connected to rotate therewith, a second cam mounted to rotate about the axis of said shaft, gearing between said cams for rotating the second cam in the opposite direction from that of the first cam, and operating connections between said cams and the plungers.

13. The combination of a container for molten glass having a discharge orifice, plungers projecting into the glass in the container, means to reciprocate the plungers comprising a rotating shaft, a cam connected to rotate therewith, a second cam mounted to rotate about the axis of said shaft, gearing between said cams for rotating the second cam in the opposite direction from that of the first cam, operating connections between said cams and the plungers, and means to differentially adjust the relative rotative positions of said cams and thereby differentially vary the relative timing of the plunger operations.

14. The combination of a chamber to contain molten glass having a discharge opening, plungers extending into the glass in the chamber, means to reciprocate the plungers toward and from the discharge opening, each plunger being arranged to oppose the movement of the glass away from the discharge orifice while the other plunger is moving toward the orifice, and thereby assist in maintaining an expelling force on the glass as the other plunger moves toward the orifice.

15. The combination of a container for molten glass including a discharge chamber having an outlet opening, plungers projecting into the said chamber through restricted openings provided in the walls of said chamber, the plungers being in substantially equivalent positions relative to the outlet opening, and means to reciprocate each plunger toward and from the opening.

16. The combination of a displacement chamber to contain molten glass provided with an outlet opening for the discharge of glass and inlet openings through which glass enters the chamber, a stationary valve to regulate the amount of glass entering through one of said inlet openings, a plunger projecting through the other inlet opening into the glass in said chamber, and means to reciprocate the plunger toward and from the outlet opening.

17. The combination of a container for molten glass, a displacement chamber having passageways leading from said container, plungers, and means to reciprocate them in said passageways.

18. The combination of a container for molten glass, a displacement chamber having passageways leading from said container, plungers, means to reciprocate them in said passageways, and means to differentially adjust the relative timing of the plunger operations.

19. The combination of a container for molten glass, a displacement chamber having separate passageways leading from said container into said chamber, a regulating valve restricting one of said passageways, means to adjust said valve to vary the restriction, and a plunger arranged to reciprocate in another of said passageways.

20. The combination of a container for molten glass, a displacement chamber having passageways leading from said container, a regulating valve restricting one of said passageways, means to adjust said valve to vary the restriction, plungers extending into the other passageways, and means to reciprocate said plungers in alternation.

21. The combination of a furnace boot or extension having a displacement chamber therein to contain molten glass, said chamber having an outlet orifice in the bottom thereof, a trough or channel in said boot through which molten glass is conducted to a point over said displacement chamber and beyond said outlet orifice, and means operating periodically to regulate and control the discharge of glass through said orifice.

22. The combination of a furnace boot or extension provided with a displacement chamber having an outlet orifice in the bottom thereof, a trough within said boot arranged to conduct glass from the furnace and discharge it in a constant stream into said chamber at a point beyond said outlet, and means to control the discharge of glass through said outlet.

Signed at Toledo, in the county of Lucas and State of Ohio, this 26th day of October, 1921.

LEONARD D. SOUBIER.
ENOCH T. FERNGREN.